(12) United States Patent
Verbil

(10) Patent No.: US 8,458,035 B2
(45) Date of Patent: Jun. 4, 2013

(54) SYSTEMS AND METHODS FOR ADVERTISING USING PAY-PER-CALL

(75) Inventor: John Verbil, Scottsdale, AZ (US)

(73) Assignee: Qwest Communications International Inc., Denver, CO (US)

(*) Notice: Subject to any disclaimer, the term of this patent is extended or adjusted under 35 U.S.C. 154(b) by 472 days.

(21) Appl. No.: 12/715,690

(22) Filed: Mar. 2, 2010

(65) Prior Publication Data

US 2011/0218853 A1  Sep. 8, 2011

(51) Int. Cl.
*G06Q 30/00* (2012.01)

(52) U.S. Cl.
USPC .................. 705/14.69; 705/14.73; 705/14.54

(58) Field of Classification Search
USPC .................. 705/14.69, 14.73, 14.54
See application file for complete search history.

(56) References Cited

U.S. PATENT DOCUMENTS

| | | | |
|---|---|---|---|
| 8,170,189 B2* | 5/2012 | Alperin et al. | 379/142.14 |
| 8,280,018 B2* | 10/2012 | Altberg et al. | 379/114.17 |
| 2004/0215515 A1* | 10/2004 | Perry | 705/14 |
| 2005/0203799 A1* | 9/2005 | Faber et al. | 705/14 |
| 2006/0259365 A1* | 11/2006 | Agarwal et al. | 705/14 |
| 2007/0112656 A1* | 5/2007 | Howe et al. | 705/14 |
| 2007/0127650 A1* | 6/2007 | Altberg et al. | 379/114.13 |
| 2008/0170676 A1* | 7/2008 | Douma et al. | 379/114.13 |

* cited by examiner

*Primary Examiner* — Michael Bekerman

(74) *Attorney, Agent, or Firm* — Swanson & Bratschun, L.L.C.

(57) ABSTRACT

Methods and systems are disclosed for providing online advertisements to consumers. A method disclosed herein allows a consumer to provide contact information to a business in response to a search request submitted to a search engine. Subsequently, the business may initiate a communication to the consumer at the contact information provided by the consumer. As a result, the business has better assurance that the advertisement fees provided to the search engine is in fact generating better consumer contacts for the business. In an embodiment of the system disclosed herein a telecommunications service provider may receive the contact information from the consumer and establish a line of communication between the consumer and the business.

30 Claims, 9 Drawing Sheets

SYSTEMS AND METHODS FOR ADVERTISING USING PAY-PER-CALL

FIELD OF THE INVENTION

Embodiments of the invention are related to a method and system of providing advertising services and specifically for online advertising.

BACKGROUND

Advertising using traditional media, such as television, radio, newspapers and magazines, is well known. Recently, advertising over more interactive media has become popular. For example, as the number of people using the Internet has exploded, advertisers have come to appreciate media and services offered over the Internet as a potentially powerful means to advertise.

Advertisers have developed several strategies in an attempt to maximize the value of such advertising using the Internet. In one strategy, advertisers use popular presences or means for providing interactive media or services (referred to as "Web sites" in the specification without loss of generality) as conduits to reach a large audience. Using this first approach, an advertiser may place ads on, for example, the home page of the Denver Post Web site, or the particular section of the Wall Street Journal™ site. In another strategy, an advertiser may attempt to target its ads to niche audiences, thereby increasing the likelihood of a positive response by the audience. For example, a company promoting baseball gear might place ads on the Colorado Rockies™ subdirectory of the Yahoo™ Web site. An advertiser will normally determine such targeting manually or using some proprietary method.

Recently, several popular search engines allow placement of ads based on search results by users. Thus, for example, when a consumer uses Google™ to search for a business on Google™'s website, its search engine generates several results including a number of sponsored links. For example, when a user in Arizona searches for "plumbers in Phoenix," the Google™ search engine may return a number of sponsored links at the top of the page providing information about several businesses that may have paid to be the sponsored companies. FIG. 1 shows a screen shot 10 of such a search result from Google™. As shown in the FIG. 1, the results show such "sponsored links" on the top and right of the resulting web page. Subsequently, if a user clicks on one of these links, such as the link 12 for Donely Service Center™, Google™ is paid by the sponsor of the link 12 for the user's click. Such payment may be $0.10 per click, etc., depending on the arrangement between the link sponsor and Google™. As a result of a user's clicking on the link 12, Google™ may direct the user to a website of the sponsor, such as the website 14 shown in FIG. 2.

However, for the sponsor of such link, there is no guarantee that the person that clicks on that link will actually contact the business, let alone buy something from that business. For example, a user may click on the link 12 to open the website 14, but after that the user may simply click the back-page button 16 to go back to the results of the search as shown in FIG. 1, or the user may click on the close window button 18 to simply close the search. However, whatever is the user's action, in this case the sponsor of link 12 will end up paying to Google™ for a prominent position on the search result page 10 and for user's clicking on the link 12. In this situation, the sponsor may have to resort to special arrangements, such as a special telephone number unique to the link, etc., to find out the real value (i.e., whether the consumer bought anything from the sponsor's business or contacted the sponsor's business) derived from such payments. Such special arrangements may be costly to the business, especially when the business uses a number of different search engines to promote its business.

Another example of such sponsored links is provided in FIG. 3, which shows the home page 20 of the New York Times™ with several advertising links 22, 24, etc. Here also when a user clicks on one of these links 22, 24, the user is taken to the web page of the sponsor of these links. For example, when a user clicks on link 22, a user may be directed to the home page of Lufthansa™. However, it may be difficult or costly for the business to find out whether, the user that opened the web-site of Lufthansa™, contacted Lufthansa™ or undertook any transaction with the company.

Similar problems are present in other forms of online advertising, such as advertising based on the content of e-mail, advertising based on online purchases by a consumer, etc.

Therefore, there is a need for a better method and system for providing online advertising wherein a sponsor paying for online a advertising has some way of knowing whether the user selecting the advertisement contacted the sponsor.

BRIEF SUMMARY

Among other things, embodiments of the invention include methods and systems for providing online advertisements to consumers. A method disclosed herein allows a consumer to provide contact information to a business in response to a search request submitted to a search engine. Subsequently, the business may initiate a communication to the consumer at the contact information provided by the consumer. As a result, the business may get better assurance that the advertisement fees provided to the search engine is in fact generating better consumer contacts for the business. In an embodiment of the system disclosed herein a telecommunications service provider may receive the contact information from the consumer and establish a line of communication between the consumer and the business.

In an alternate set of embodiments, a method is provided for connecting a consumer with a business, the method comprising: providing an online advertisement of the business on a website being viewed by the consumer; receiving an indication of interest from the consumer about the online advertisement; in response to the indication of interest, presenting an input option to the consumer for contacting the business; receiving contact information from the consumer via the input option; initiating a line of communication between the business and the consumer using the contact information; and charging a fee to the business for initiating the line of communication.

In an alternate embodiment, initiating a line of communication between the business and the consumer further comprises: automatically transmitting the consumer contact information to a telecommunication service provider (Telco); generating a first line of communication from the Telco to the business; generating a second line of communication from the Telco to the consumer; and connecting the first line of communication and the second line of connection.

In yet another embodiment, a method is provided for connecting a business to a consumer, the method comprising: receiving an advertisement from the business; combining at least part of the advertisement with a webpage to generate a first document; presenting the first document to the consumer; receiving a selection signal from the consumer selecting the at least part of the advertisement; in response to the selection signal, generating a second document to the consumer, the second document including an input window to receive consumer contact information; receiving the consumer contact information; and establishing a line of communication originating from the business to the consumer using the consumer contact information.

In another set of embodiments, a system is provided for connecting a business to a consumer, the system including a network; a search engine module communicatively connected to the network, wherein the search engine module is adapted to: receive a search request from a consumer computing device, generate a search result document in response to the search request, wherein the search result document includes a request for consumer contact information, transmit the search result document to the consumer computing device, receive the consumer contact information from the consumer computing device, and transmit the consumer contact information to an automated call generation module; wherein the automated call generation module is communicatively connected to the network and wherein the automated call generation module is adapted to: receive the consumer contact information, and generate a line of communication from a communications equipment located at the business to the consumer.

In an alternate embodiment, the automated call generation module is further adapted to establish the line of communication between the business and the consumer by: automatically transmitting the consumer contact information to a telecommunication service provider (Telco), generating a first line of communication from the Telco to the business, generating a second line of communication from the Telco to the consumer, and connecting the first line of communication and the second line of communication.

BRIEF DESCRIPTION OF THE DRAWINGS

A further understanding of the nature and advantages of the present invention may be realized by reference to the figures, which are described in the remaining portion of the specification. In these figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTION

There are various configurations and embodiments that may be used to implement the present invention. In the following description, for the purposes of explanation, numerous specific details are set forth in order to provide a thorough understanding of the present invention. It will be apparent, however, to one skilled in the art that the present invention may be practiced without some of these specific details. For example, while various features are ascribed to particular embodiments, which should be appreciated that the features described with respect to one embodiment may be incorporated with other embodiments as well. By the same token, however, no single feature or features of any described embodiment should be considered essential to the invention, as other embodiments of the invention may omit such features. Further, while various embodiments may be described with reference to the Internet, embodiments of the invention may be implemented in any network.

Figure 4:
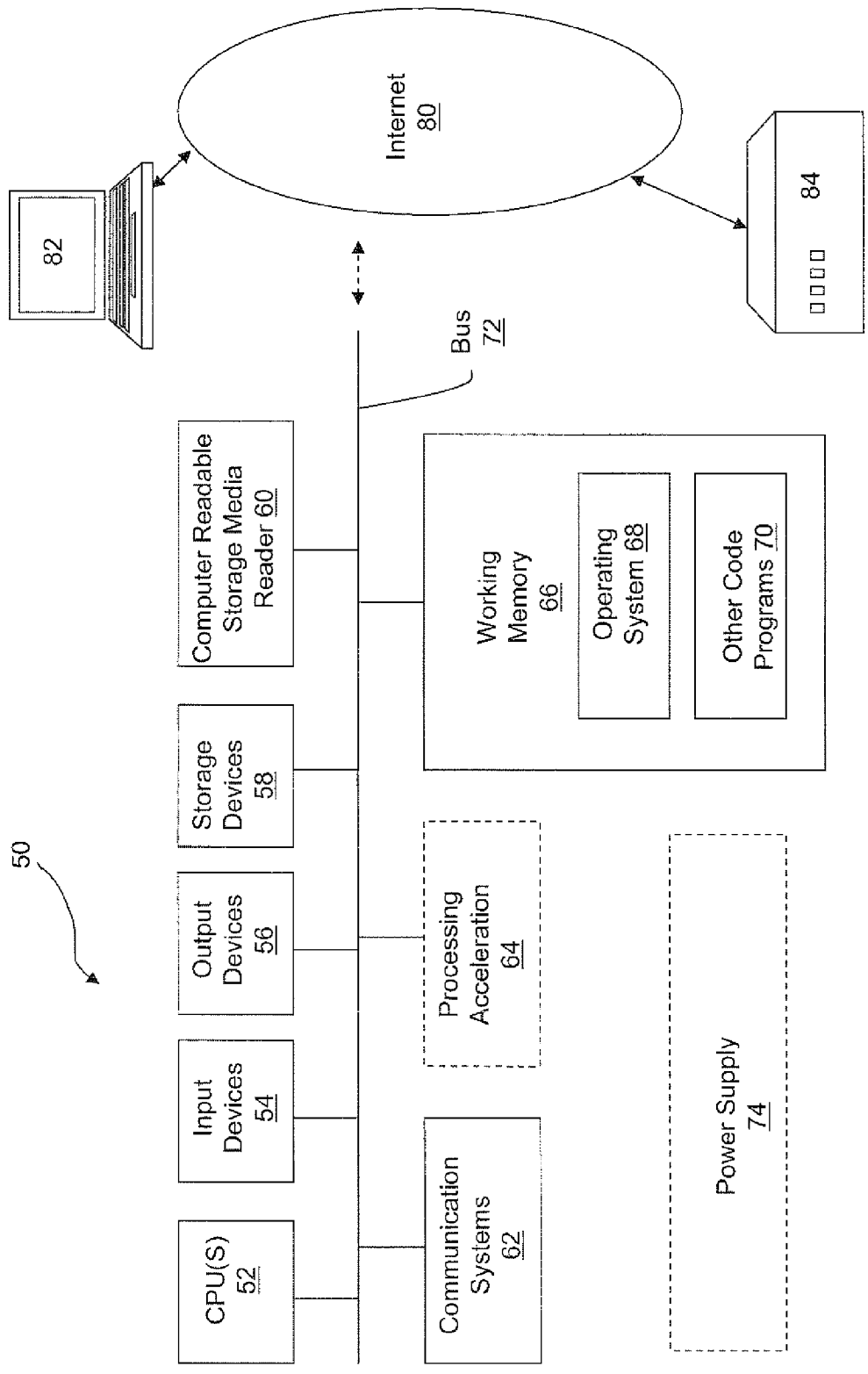
FIG. 4 illustrates a block diagram illustrating an exemplary computer system for implementing embodiments of the present invention.

Turning now to FIG. 4, which illustrates a block diagram of an exemplary computer system 50 that may be used for implementing embodiments of the present invention. This example illustrates a computer system 50 such as may be used, in whole, in part, or with various modifications, to provide a server, manager, end device, a billing engine, or other systems such as those discussed above.

The computer system 50 is shown comprising hardware elements that may be electrically or wirelessly coupled via a bus 72. The hardware elements may include one or more central processing units (CPUs) 52, one or more input devices 54 (e.g., a mouse, a keyboard, etc.), and one or more output devices 56 (e.g., a display device, a printer, etc.). The computer system 50 may also include one or more storage device 58. By way of example, storage device(s) 58 may be disk drives, optical storage devices, solid-state storage device such as a random access memory ("RAM") and/or a read-only memory ("ROM"), which can be programmable, flash-updateable and/or the like.

The computer system 50 may additionally include a computer-readable storage media reader 60, a communications system 62 (e.g., a modem, a network card (wireless or wired), an infra-red communication device, etc.), and working memory 66, which may include RAM and ROM devices as described above. In some embodiments, the computer system 50 may also include a processing acceleration unit 64, which can include a DSP, a special-purpose processor and/or the like. The various components of the computer system 50 may be powered by the power supply 74, which may include internal and/or external power sources.

The computer-readable storage media reader 60 can further be connected to a computer-readable storage medium, together (and, optionally, in combination with storage device (s) 58) comprehensively representing remote, local, fixed, and/or removable storage devices plus storage media for temporarily and/or more permanently containing computer-readable information. The communications system 62 may permit data to be exchanged with a network and/or any other computer(s).

The computer system 50 may also comprise software elements, shown as being currently located within a working memory 66, including an operating system 68 and/or other code 70. For example, one of more of the various methods of providing advertising, initiating phone calls, maintaining track of the revenues generated by the advertising, etc., may be implemented by special programs stored in the other code 70. Software of computer system 50 may include code for implementing any or all of the function of the various elements of the architecture as described herein. Methods implemented by software on some of these components will be discussed in detail below.

It should be appreciated that alternate embodiments of a computer system 50 may have numerous variations from that described above. For example, customized hardware might also be used and/or particular elements might be implemented in hardware, software (including portable software, such as applets), or both. Further, connection to other computing devices such as network input/output devices may be employed and part of the software or hardware may be distributed between various computers/servers over a network. For example, in an embodiment of the computer system 50, the bus 72 may be connected to an external communication bus connected to a network such as the Internet 80. Thus, one or more of the software modules implementing the systems and methods described herein may be located on a network computer 82. Similarly, some of the data and/or programs may be stored on a network storage device 84.

Figure 5:
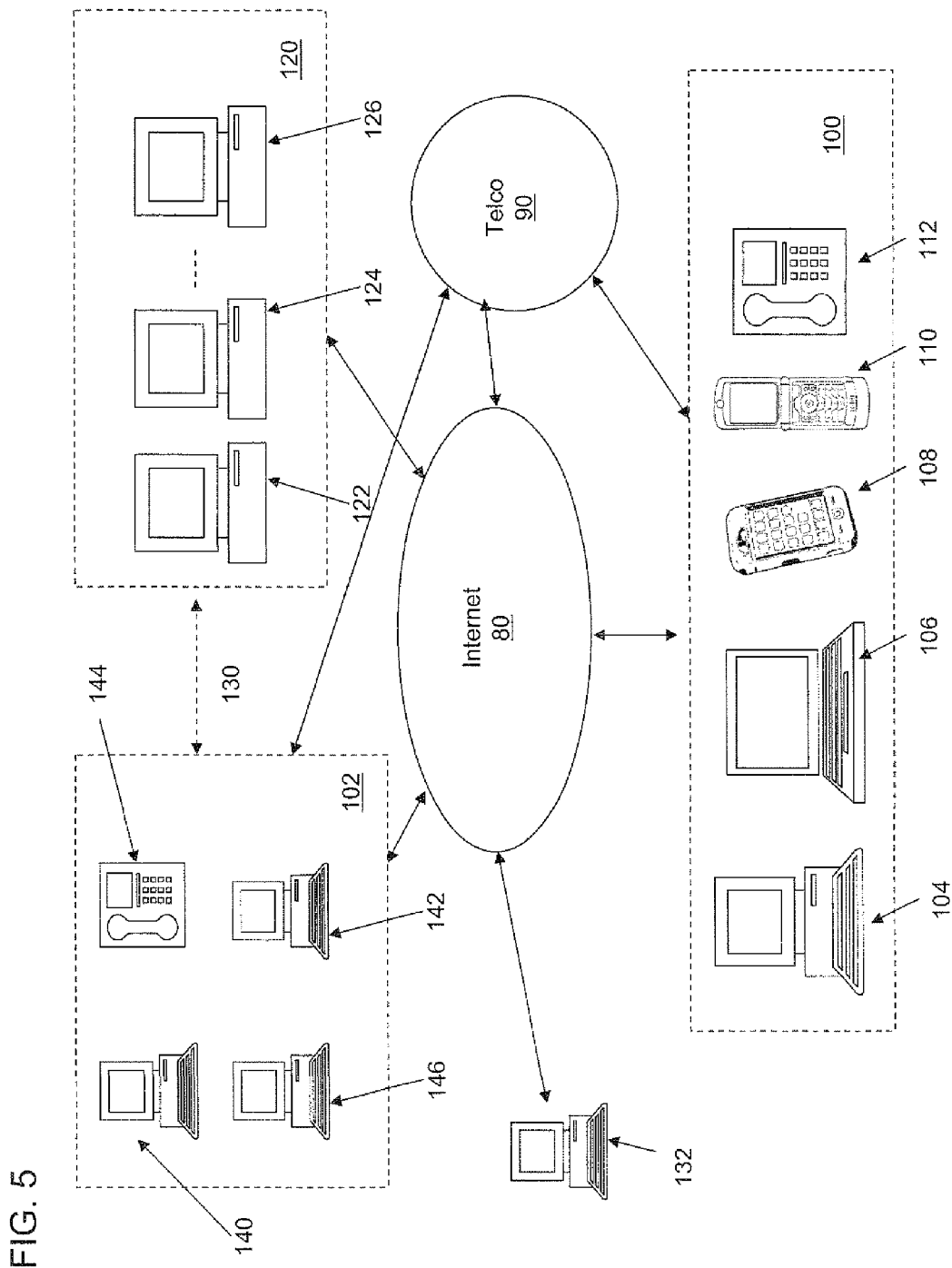
FIG. 5 illustrates a block diagram of an exemplary implementation of a network for implementing embodiments of the present invention.

Turning now to FIG. 5., which illustrates a simple network diagram of various components that may be used in implementing the embodiments described herein. Specifically, FIG. 5 illustrates a consumer 100 using the Internet 80 to collect information. For example, the consumer 100 may be conducting an Internet search via a web-based search engine for a particular type of information and connecting to a business 102 as a result of the method and system provided herein. The consumer 100 may execute the search using any one of a desktop 104, a laptop 106, a PDA 108, a cell-phone 110, etc. The search may be communicated via the Internet 80 or any other network connecting the consumer devices 104-110 to a network. Each of the devices 104-110 may use one or more components of the computer system 50 described above with respect to FIG. 4 and they may be able to communicate with a telephone 144 located at the business 102 using landline, wireless, or any other communication system. Additionally, the consumer 100 may also use a land-line phone 112 that may be able to communicate with the business 102 via a POTS network, using the voice-over-IP using the Internet 80, or some other means.

The consumer 100 may be connected to the Internet 80 via one of various connections provided by a telecommunications service provider (hereinafter "Telco") 90. The consumer 100 may be connected to the Internet 80 via a DSL line, a cellular connection, a Wi-Fi connection, a WiMax connection, other broadband wireless connection, a dial-up connection, a cable modem connection, etc. One or more of such connections may be provided by the Telco 90. Additionally, the consumer 100 may also be connected to the business 102 via a POTS/PSTN or other communication network provided by the Telco 90.

In an embodiment, a search engine web-page provided to the consumer devices 104-110 may be generated and managed by a search engine company using a search engine server 120. The search engine server 120 may include a web-server 122, a data-server 124, a search engine 126, etc. The search engine server 120 may be connected to the business 102 via a direct communication line 130 or by the Internet 80. Generally speaking, the search engine server 120 may accumulate and analyze various searches conducted by the consumer 100 as well all the other participants using the Internet 80 to access various businesses, including searches for the business 102. Additionally, a web-server 132 may also be provided that hosts the website of the business 102 or any other websites that may display an advertisement of the business 102.

When the consumer 100 places a search request for business 102, or for services provided by the business 102, in the search engine web-page displayed to the consumer by a browser on any of the devices 104-110, the information about the search request may be communicated via the Internet 80 to the search engine server 120. The search engine server 120 may transmit the results to the consumer 100 via the Internet 80 or any other appropriate means. The search engine server 120 may include the information about the business 102, including the web-site of the business 102 if applicable, as part of the search results. In addition, if the business 102 has entered into an advertising arrangement with the search engine server 120, the search engine server 120 may also return the information about the business 102 as part of sponsored links on the search results provided to the consumer 100.

In an embodiment of the system disclosed herein, the business 102 may also include an automated calling system 140. Such automated calling system 140 may be used to receive a telephone number provided by the consumer 100 and to automatically generate a telephone call from the telephone equipment 144 located at the business 102 to such telephone number provided by the consumer 100. While the embodiment disclosed herein provide such automated calling system 140 to be located at the business 102, in an alternate embodiment, the automated calling system 140 may be located at the facility of a telecommunication company, in which case it may be adapted to provide such automated calling service to not just business 102, but to a number of other businesses as well. The automated calling system 140 may be implemented using a computer system such as the computer system 50 described in FIG. 4.

Additionally, the business 102 may also include a billing engine 142 that keeps track of the number of telephone calls generated by the business 102 in response to requests received from various consumers as a result of search results provided by the search engine server 120. Such billing engine 142 may also be implemented using a computer system such as the computer system 50 described in FIG. 4. In an alternate embodiment, the billing engine 142 may be implemented at the location of a telecommunication company hosting the automated calling system 140. Finally, the business 102 may also include a business computing system 146 that may be used by one or more business personnel for conducting one or more business operations, including communicating with consumers.

Figure 6:
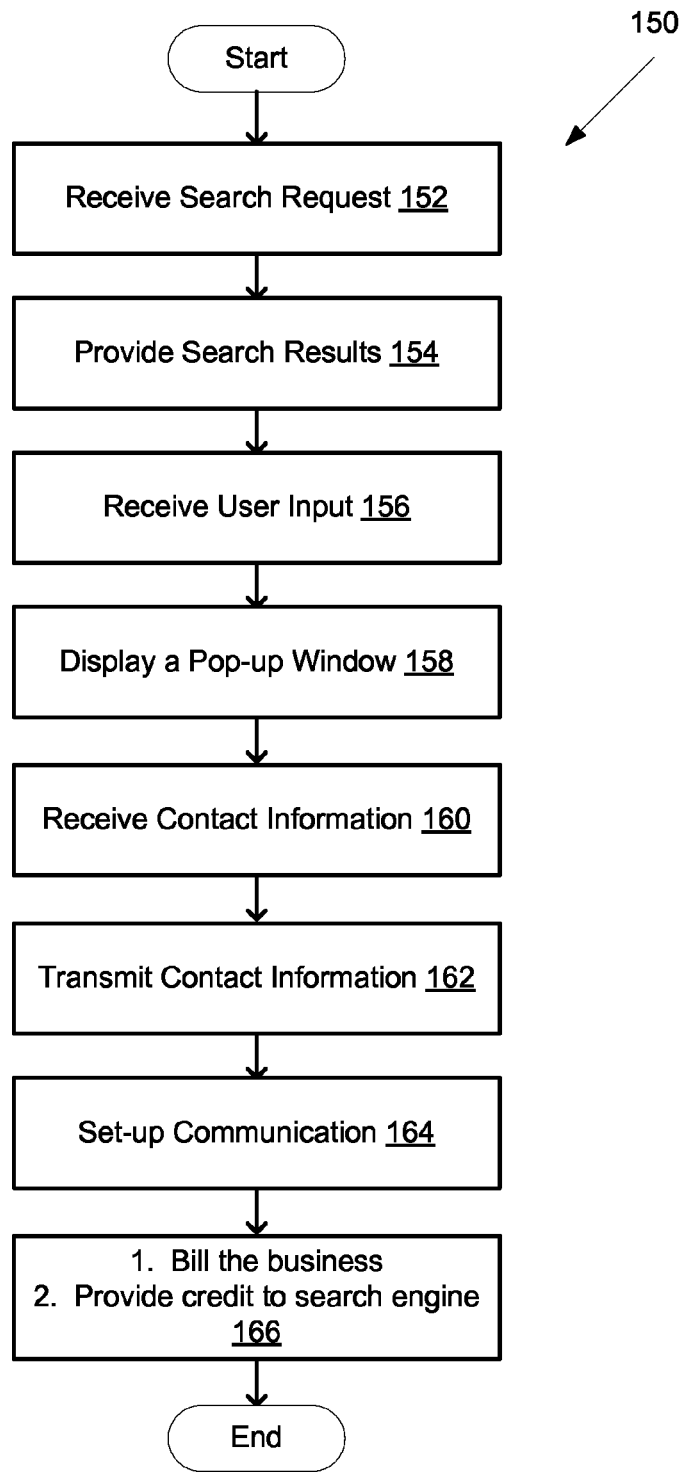
FIG. 6 illustrates an example flowchart of a method of providing advertisements to consumers.

Turning now to FIG. 6, a flowchart 150 illustrates an example method of providing advertisements to consumers. At a block 152, the search engine server 120, such as Google™, Yahoo™, etc., receives a search request from the consumer 100. Such a search request may be received by the search engine from the consumer 100 using the desktop computer 104, the laptop computer 106, the PDA 108, the wireless phone 110, etc. In response to the search request, at a block 154, the search engine server 120 provides a list of search results to the consumer 100. Such results may be displayed on the devices 104-110 via an appropriate browser such as Internet Explorer™, Safari™, Mozilla™ Firefox™, etc.

Once the consumer 100 receives the search results, at a block 156, the consumer 100 may select one or more of the search results. Selecting a search result may be accomplished by, for example, clicking on a link for the search result, etc. In some instances, the consumer 100 may select a search result that is not for a business that has an advertising arrangement with provider of the search engine. However, in other instances, the consumer 100 may select a search result that is part of the sponsored results, i.e., it is a search result from a business that advertises through the search engine provider, such as the business 102. If the consumer 100 selects that information about the business 102 that is displayed along with or as part of the search results, at a block 158 a pop-up window may be displayed on the consumer devices 104-110 used to conduct the search.

The pop-up window displayed on the consumer device 104-110 may include information about the business 102, such as the address of the business 102, services provided by the business 102, the phone number of the business 102, etc. Additionally, the pop-up window displayed at block 158 may also include a request to the consumer 100 to input the consumer's contact information. For example, the pop-up window may ask the consumer 100 whether the consumer 100 would like to be contacted by the business 102. Additionally, the pop-up window may also include an input field that may be populated by the consumer 100. In one embodiment, the consumer 100 may be requested to input a contact phone number in the input field.

In yet another embodiment, the pop-up window may be generated in a manner so as to automatically include contact information about the consumer. Thus, for example, the pop-up window may be already populated with the consumer's phone number so that the consumer does not have to input this information manually. Such information about the consumer may be retrieved from, for example, a cookie that is stored on the consumer's computing device. Alternatively, the browser used by the consumer may be able to store and provide such information about the consumer to the application generating the pop-up window. In yet alternative embodiment, the pop-up window may be populated with other information about the consumer, such as the consumer's IM address, e-mail address, etc. The decision as to whether to populate the pop-up window with the phone number, the IM address, or the email address may be made based on the consumer's past behavior and/or general preferences. For example, if in the prior instances the consumer selected to provide a phone number, then the pop-up window may be populated with the phone number in the subsequent instances. Such past behavior may include the consumer's selections with regards to the vendor that is providing the advertisement selected by the consumer, or based on the consumer's selection in general with respect to other vendors.

At a block 160, the consumer 100 may provide the contact information and select a button providing his or her consent to be contacted by the business 102. In an embodiment of the method and system described herein, the pop-up window may also ask the consumer 100 as to the mode of being connected from the business 102. For example, in one case the consumer 100 may provide a phone number as the contact information and elect to receive a telephone call from the business 102. In an alternate embodiment, the consumer 100 may still provide the phone number as the contact information, however, in this case the consumer 100 may elect to receive a simple messaging system (SMS) message from the business 102. In yet alternate embodiment, the consumer 100 may provide an instant messaging (IM) identification as the contact information and elect to receive an IM communication from the business 102. As one of skill in the art would appreciate, a number of other contact means, such as e-mail, etc., may be elected by the consumer 100.

Subsequently, at a block 162, the consumer's contact information is communicated to the business 102. Thus, if the consumer 100 has provided a phone number as the contact information, such phone number is transmitted to the business 102. In an embodiment of the method and system provided herein, a number of other information may also be communicated to the business 102. For example, in one embodiment, if the search engine server has cookies installed on the consumer 100's devices 104-110 used for generating the search request at block 152, information about the consumer 100 available through use of such cookies may also be communicated to the business along with the contact information. For example, in one embodiment, the business 102 may also be provided with information about the consumer's devices' 104-110 IP address, which may be useful in determining the consumer's geographic location. In another embodiment, the consumer devices' 104-110 type (such as an iPhone, Blackberry, etc.) may also be provided to the business 102, so that the business 102 may make some extrapolation about the consumer 100's purchasing style, purchasing power, etc. In yet another alternate embodiment, information about the search request that was used to generate the search results may also be transmitted to the business 102, so that the business 102 may have better understanding of what the consumer 100 is looking for by contacting the business 102. Thus if the consumer 100 used a string "plumber Phoenix sink faucet," when the business 102 receives this string attached to the consumer's contact information, the business 102 would know that the consumer is looking for a problem to be fixed with a sink faucet.

In yet another alternate embodiment, information about the search engine that was used to generate the search results may also be transmitted to the business 102. Such information may be necessary for providing appropriate billing information to the business. For example, if Google™ was used as the search engine and the consumer 100 elected to send contact information as a result of such search, the business 102 may owe appropriate higher advertising fee to Google™.

In yet another embodiment, the consumer's 100 contact information is also communicated to the Telco 90. Moreover, any additional data that is being transmitted to the business 102 may also be transmitted to the Telco 90. As discussed below in further detail in FIG. 9, the Telco 90 may use the consumer's 100 contact information and the other data to initiate or facilitate a communication between the consumer 100 and the business 102. In yet another alternate embodiment, the consumer's 100 contact information may not be sent to the business 102 at all, but it may be transmitted only to the Telco 90. Alternatively, if the business 102 has designated an alternate service provider, such as a call center to attend to the inquiries from the consumers, the consumer's 100 contact information may be transmitted to such alternate service provider.

Once the consumer's contact information and the accompanying information are received by the business 102, the business 102 may undertake a number of automatic steps based on the contact information and the accompanying information. For example, in one case at a block 164, the automated calling system 140 located at the business 102 may use the contact information to generate a telephone call from the business 102 to the consumer 100.

In an alternate embodiment, the automated calling system may first display the request from the consumer and the accompanying information to contact personnel at the business 102 on the business computing system 146 and provide the contact personnel an option to initiate a communication with the consumer 100 by selecting a button on such computer screen. Using such an alternate embodiment allows the contact personnel at the business 102 to determine whether if they want to initiate a communication with the consumer or not. Additionally, it also allows such contact personnel to gather additional information that may be useful in their conversation with the consumer 100. Thus for example, if the information transmitted at block 162 includes some information about the geographic location of the consumer 100, the contact personnel may gather information about products available in such geographic location before initiating a communication with the consumer 100. In an alternate embodiment, if the information transmitted to the business 102 at the block 162 includes any information about the consumer's 100 prior purchases, the business 102 may use such information during communicating with the consumer 100.

Subsequently, at block 166 the billing engine 142 may make appropriate entry into a billing log of the business 102 for the amount of advertising fees due by the business 102 to the company operating the search engine server 120. Alternatively, the billing engine 142 may charge the business 102 for advertising fee to be paid to the telecommunications company managing the automated calling system 140. In such as case, the telecommunication company may in turn pay the appropriate fee to the operator of the search engine server 120.

Figure 7:
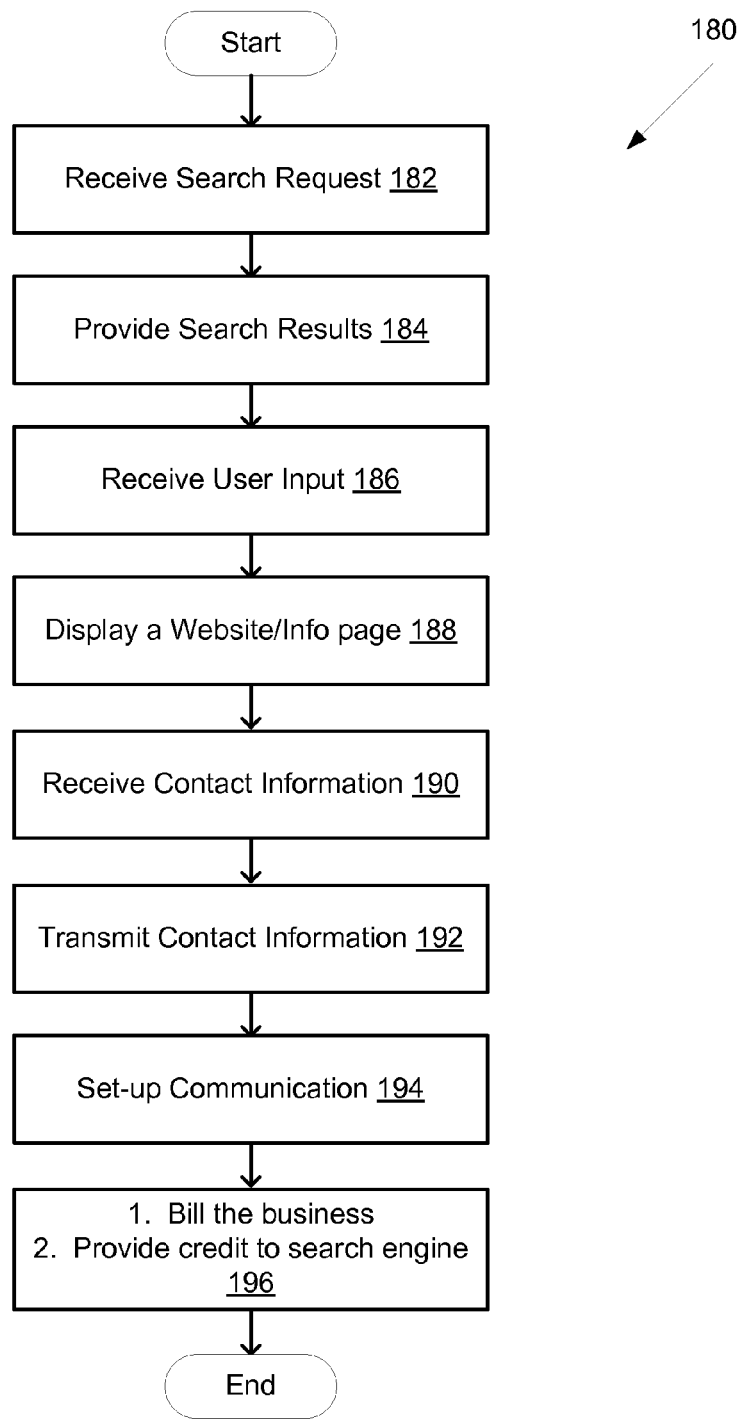
FIG. 7 illustrates an example flowchart of an alternate method of providing advertisements to consumers.

FIG. 7 discloses a flowchart 180 of an alternate method of providing advertisements to consumers. There are many steps of this alternate flowchart 180 that are similar to the steps disclosed with respect to the flowchart 150 of FIG. 6. For example, blocks 182-186 may perform functions similar to the blocks 152-156 of FIG. 6. While block 158 displays a pop-up window to the consumer 100, block 188, as illustrated in FIG. 7, may display a website for the business 102 (or other information page) that contains the information about the business 102. Such website may be hosted on, for example, in the web-server 132 as illustrated in FIG. 4.

In such a case, the website 102 may include a request to the consumer 100 for the consumer's 100 contact information and for the preferred method of receiving communication from the business 102. At block 190, the consumer 100 may provide the contact information as well as any other such information. Subsequent blocks 192-196 may perform functions similar to the blocks 162-166 of FIG. 6.

In an alternate embodiment of the methods and systems disclosed herein, alternate means of collecting information from a consumer, of establishing communication between a business and the consumer, and of calculating fees for the advertising services may be provided.

For example, in one embodiment, a computer located at a particular monitoring node on the Internet 80 may monitor and analyze content of e-mail communication pertaining to a consumer. In response to the analysis of such e-mail communication content, such node may display a pop-up on the computing device 104-110 of the consumer in a manner generated at block 158 or display a website to the consumer in a manner displayed at block 188. For example, if an e-mail communication from a consumer has content that discusses problems with plumbing at the consumer's premise in Phoenix, Ariz., the monitoring node may display a pop-up with information about a plumbing business in Phoenix, Ariz.

In an alternate embodiment, when the consumer 100 provides a phone number as a contact information and selects SMS as a means of preferred communication at block 160, the automated calling system 140 may initiate an SMS message to the consumer 100 from the business 102. Similarly, if the consumer 100 provides an IM address as contact information, the automated calling system 140 may generate an IM from the business 102 to the consumer 100.

In yet another alternate embodiment, the business 102 may have a contractual arrangement with a search engine provider where if a transaction is completed with the consumer during a communication initiated as a result of a search conducted by a consumer, additional fees are to be paid to the search engine provider. In such a case, the block 166 may monitor and analyze the content of communication over the telephone (or via an SMS message, IM message, etc.) to determine the status and amount of any transaction between the business 102 and the consumer 100, and generate appropriate billing entry resulting from such transaction.

Figure 1:
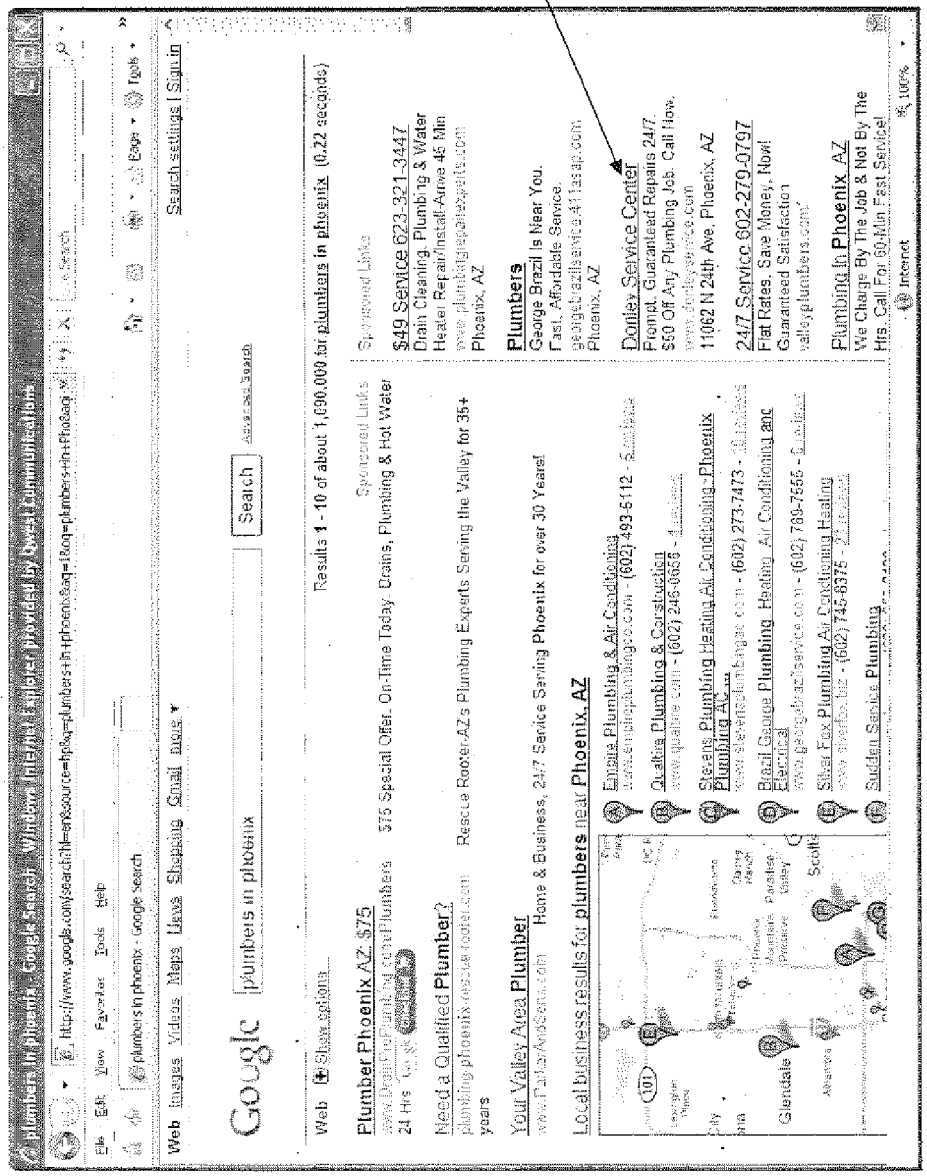
FIG. 1 illustrates a web page showing results of search engine output.
Figure 2:
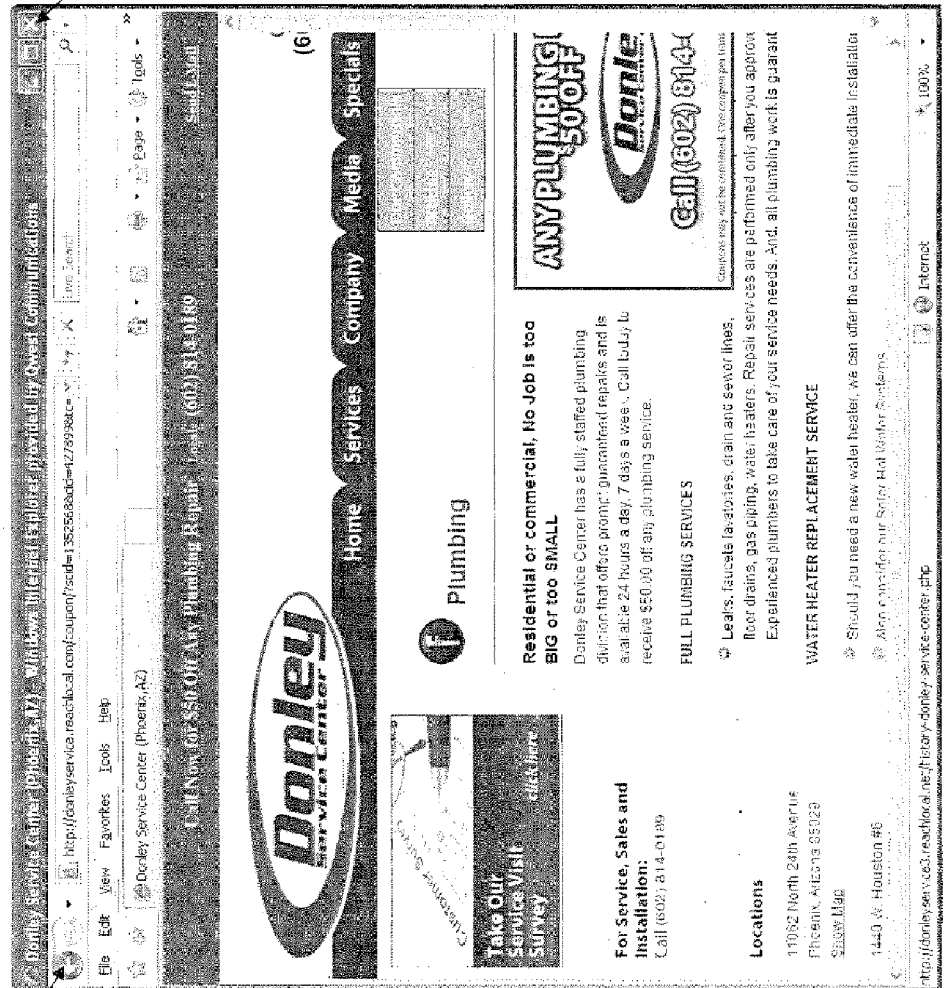
FIG. 2 illustrates a web page of a sponsor of an advertisement on search engine output.
Figure 3:
FIG. 3 illustrates a web page showing a banner advertisement.
Figure 8:
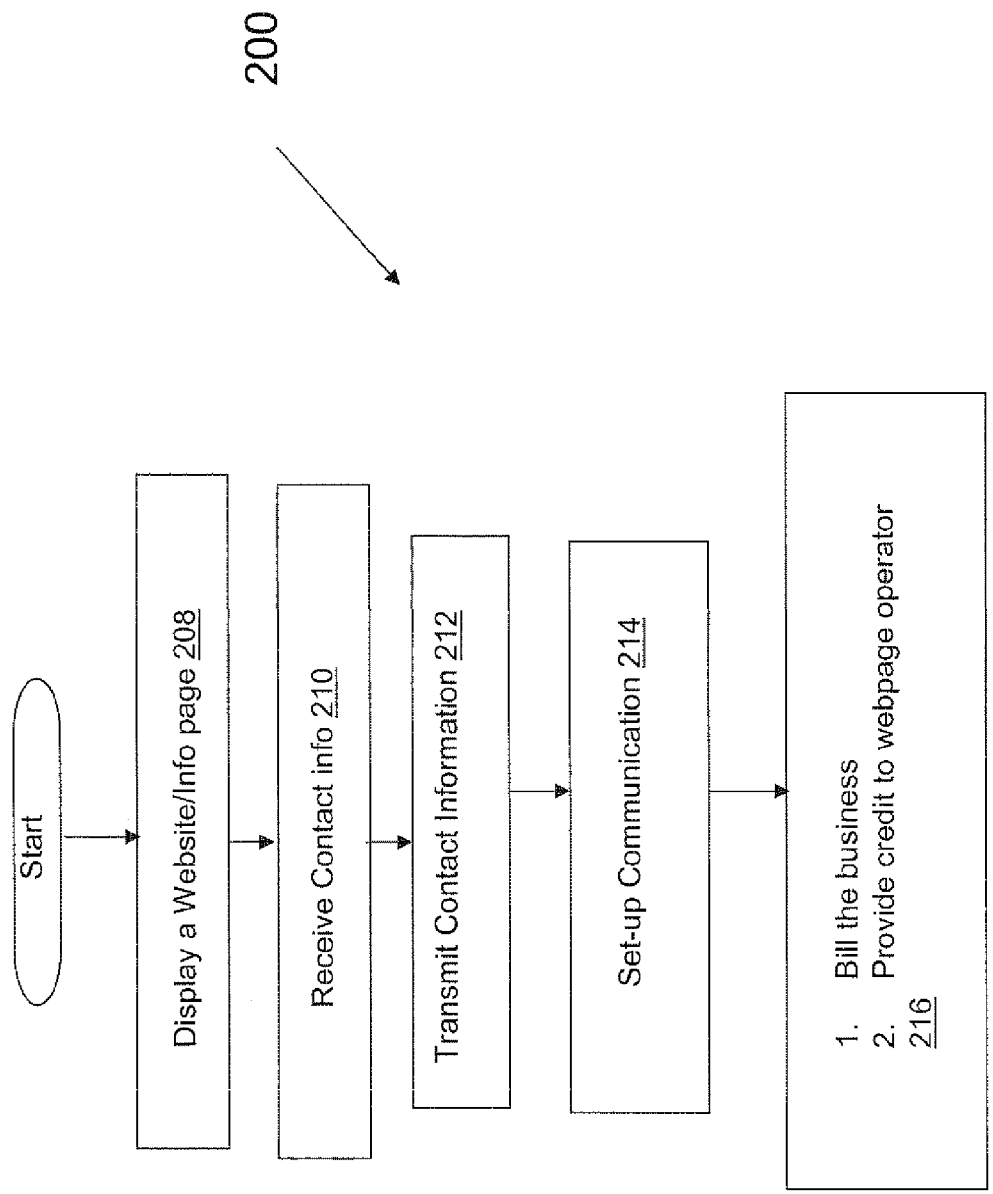
FIG. 8 illustrates an example flowchart of an alternate method of providing advertisements to consumers.

FIG. 8 illustrates a flowchart 200 of a yet another embodiment of the method of connecting a consumer with a business. There are many steps of this alternate flowchart 200 that are similar to the steps disclosed with respect to the flowchart 150 of FIG. 6 and the flowchart 180 of FIG. 7. At block 208, an advertisement may be provided on a web-page, such as the advertisement 22 on the web-page 20 as illustrated in FIG. 2. For example, a website hosted by a website provider on the web-server 132 may display the advertisement of the business 102. The subsequent blocks 210-214 may perform functions similar to the blocks 160-164 of FIG. 6. However, because the method disclosed in FIG. 8 does not use any search engine, at block 216, the credit is provided to the operator of the web-page on which the advertisement is displayed.

In an embodiment of the method illustrated in FIG. 8, an operator of web-page 20 may first analyze any information about a consumer visiting the web-page 20 before displaying the advertisement for the business 102. For example, in an embodiment, the operator of web-page 20 may first analyze cookie information received from the consumer 100 visiting the web-page 20 and determine, based on demographic, geographic, and/or consumption information about the consumer 100, whether to display advertisement of the business 102 to the consumer 100.

Figure 9:
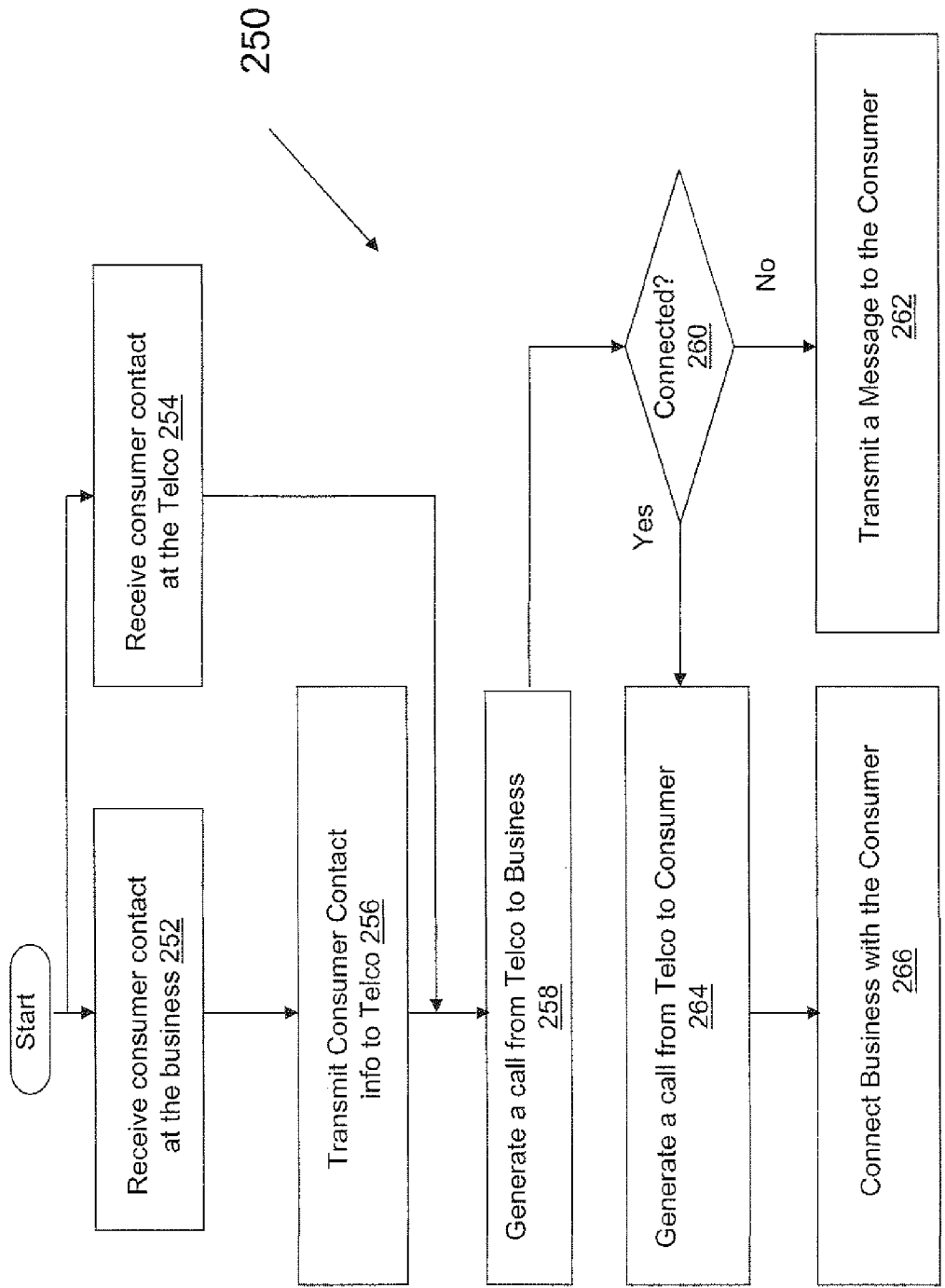
FIG. 9 illustrates an example flowchart providing a method of establishing a connection between a business and a consumer.

FIG. 9 illustrates a flowchart 250 of a yet another embodiment of the method of connecting a consumer with a business. While the various methods described above allow the business 102 to automatically connect with the consumer 100 upon receiving consumer contact information, the method described in FIG. 9 allows the Telco 90 to facilitate the connection between the consumer 100 and the business 102. Specifically, at block 252, the business 102 receives the consumer contact information. Alternatively, or in addition to the business 102 receiving the consumer contact information, at block 254, the Telco 90 may also receive the consumer contact information. Thus, for example, if the consumer 100 has selected to provide a phone number as the contact information, the phone number may also be transmitted to the Telco 90.

If the consumer contact information was initially sent only to the business 102 and not to the Telco 90, at block 256, the business 102 may transmit the consumer contact information to the Telco 90. The business may transmit such consumer contact information to the Telco 90 by sending a message over the Internet 80, via sending an automatically generated text message to a designated Telco number, via sending an automated IM message to a designated Telco IM address, etc. Additionally, the business 102 may also automatically send information about a preferred phone number where it would like to receive a phone call from the consumer 100. This allows a business owner to, for example, set up a cell phone number, a home phone number, etc., to receive calls from consumer 100. Such set-up could be automatically based on the time of the day, etc. The business 102 may also be able to change it on an ad-hoc basis as well. In yet alternate embodiment, the business 102 may provide more than one number to the Telco 90 with a first number as a primary number and the second number as a back up number so that if the first number is unavailable, the Telco 90 may use the second number to connect the business 102 with the consumer 100. Such provision for back-up number may be especially useful to a small business that does not have sophisticated call-forwarding infrastructure on its own premises.

Once the Telco 90 receives the consumer contact information, at block 258 it first generates a call to the business 102 at the number provided by the business 102 at 256, or to a predetermined number provided by the business to the Telco 90. Depending on the Telco's 90 connection with the business 102, such call may be generated using a phone call over a PSTN network, over a wireless network, etc. Subsequently, at block 260 the Telco 90 determines if it has been able to establish a live connection with the business 102. If the business 102 has provided more than one phone number, the Telco 90 may try to contact the business 102 at the primary number, the secondary number, etc.

If the Telco 90 is not able to establish a connection with the business 102, at a block 262 it may transmit a message to the consumer 100 about the business being not available at that particular moment. For example, the Telco 90 may transmit a voice mail, a text message, an IM message, etc., based on the customer information that it has available at that time. Additionally, it may also copy the message that was sent to the consumer 100 to the business 102 so that the business 102 is aware of that communication with the consumer 100.

If the Telco 90 is able to establish a connection with the business 102, at block 264, the Telco 90 generates a call to the consumer 100. Once the connection with the consumer 100 is established, at block 266 the Telco 90 connects the consumer 100 with the business 102. Once such a connection is established, the Telco 90 may make an appropriate log entry to a database tracking the number of consumer connections established for the business so that it may use such information for billing the business as appropriate.

While the invention has been described with respect to example embodiments, one skilled in the art will recognize that numerous modifications are possible. Further, while various systems described herein may be described with respect to particular structural and/or functional components for ease of description, systems are not limited to any particular structural and/or functional architecture but instead can be implemented on any suitable hardware and/or firmware configurations. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate example features, the various components and/or features described herein with respect to a particular embodiment can be substituted, added, and/or subtracted from among other described embodiments, unless the context dictates otherwise. Consequently, although the invention has been described with respect to example embodiments, it will be appreciated that the invention is intended to cover all modifications and equivalents within the scope of the following claims.

What is claimed is:

1. A method of connecting a consumer with a business, the method comprising:
   providing, by a computer operated by at a telecommunications service provider, an online advertisement of the business on a website being viewed by the consumer;
   receiving, by the computer, an indication of interest from the consumer about the online advertisement;
   in response to the indication of interest, presenting, with the computer, an input option in the form of a pop-up window to the consumer for the business to contact the consumer, wherein the input option requests the consumer to provide contact information of the consumer and requests the consumer to select a preferred mode of communication selected from a group consisting of telephone, e-mail, text messaging, and instant messaging (IM);
   receiving, by the computer, contact information and the preferred mode of communication from the consumer requested via the input option in the form of the pop-up window;
   automatically initiating, by the computer, a line of communication via preferred the mode of communication selected via the input option in the form of the pop-up window from the business to the consumer using the contact information provided via said input option in the form of the pop-up window;
   transmitting, by the computer, a message to both the consumer and the business that the business is not available at a particular moment, based on a determination that the line of communication cannot be established from the business to the consumer; and
   charging, by the computer, a fee to the business for initiating the line of communication.

2. The method of claim 1, wherein receiving of the contact information from the consumer further comprises receiving contact information by the business.

3. The method of claim 2, wherein initiating of the line of communication from the business to the consumer comprises:
   automatically transmitting the consumer contact information to the telecommunications service provider;
   generating a first line of communication from the telecommunications service provider to the business;
   generating a second line of communication from the telecommunications service provider to the consumer; and
   connecting the first line of communication and the second line of connection.

4. The method of claim 3, wherein the first line of communication comprises a telephone call from the telecommunications service provider to the business and the second line of communication comprises a telephone call from the telecommunications service provider to the consumer.

5. The method of claim 1, wherein receiving of the contact information from the consumer further comprises receiving contact information at the telecommunication service provider.

6. The method of claim 5, further comprising:
   generating a first line of communication from the telecommunications service provider to the business;
   generating a second line of communication from the telecommunications service provider to the consumer; and
   connecting the first line of communication and the second line of communication.

7. The method of claim 1, wherein providing of the online advertisement of the business further comprises:
   receiving a search request from the consumer; and
   providing search results responsive to the search request, wherein the search results include the online advertisement of the business.

8. The method of claim 1, wherein providing of the online advertisement of the business further comprises:
   analyzing content of a communication by the consumer; and
   generating the online advertisement of the business indicative of the content analysis.

9. The method of claim 1, wherein the contact information comprises the consumer's phone number.

10. The method of claim 9, wherein initiating of the communication comprises initiating a phone call from the business to the consumer's phone number.

11. The method of claim 9, wherein initiating of the communication comprises initiating a text message from the business to the consumer.

12. The method of claim 1, wherein the contact information comprises the consumer's instant messaging (IM) address.

13. The method of claim 12, wherein initiating of the communication comprises initiating an IM session from the business with the consumer.

14. The method of claim 10, wherein initiating of the phone call from the business to the consumer's phone number further comprises:
   automatically initiating a phone call from the business to the consumer; and
   alerting a contact personnel at the business regarding the call to the consumer.

15. The method of claim 14, wherein initiating of the phone call from the business to the consumer's phone number further comprises:
   receiving a set of consumer identifying information; and
   providing the set of consumer identifying information to the contact personnel.

16. The method of claim 15, further comprising:
   analyzing content of a conversation between the consumer and the contact personnel; and
   modifying the fee charged to the business based on the conversation content analysis.

17. The method of claim 15, further comprising modifying the fee charged to the business based on the amount of the consumer's business transaction as a result of the phone call from the business to the consumer.

18. A method of connecting a business to a consumer, the method comprising:
   receiving, by computer operated by a telecommunications service provider, an advertisement from the business;
   combining, by the computer, at least part of the advertisement with a webpage to generate a first document;
   presenting, by the computer, the first document to the consumer;
   receiving, by the computer, a selection signal from the consumer selecting the at least part of the advertisement;
   in response to the selection signal, generating, by the computer, a second document to the consumer, the second document including an input pop-up window to receive consumer contact information, wherein the input pop-up window requests the consumer to select a preferred mode of communication selected from a group consisting of telephone, e-mail, text messaging, and instant messaging (IM);
   receiving, by the computer, the consumer contact information and the preferred mode of communication requested via the input pop-up window;
   automatically initiating, by the computer, a line of communication via the preferred mode of communication selected via the input pop-up window originating from the business to the consumer using the consumer contact information;
   transmitting, by the telecommunications service provider, a message to both the consumer and the business that the business is not available at a particular moment, based on a determination that the line of communication cannot be established from the business to the consumer; and
   charging, by the computer, a fee to the business for initiating the line of communication.

19. The method of claim 18, wherein combining of the at least part of the advertisement with the webpage further comprises:
   receiving cookie information from the consumer;
   analyzing the cookie information; and
   based on the result of the analysis, combining the advertisement of the business with the webpage.

20. The method of claim 18, wherein receiving of the consumer contact information further comprises receiving the contact information at the telecommunication service provider.

21. The method of claim 18, wherein receiving of the consumer contact information further comprises receiving the contact information by the business.

22. The method of claim 21, wherein establishing of the line of communication from the business to the consumer comprises:
   automatically transmitting the consumer contact information to the telecommunication service provider;
   generating a first line of communication from the telecommunications service provider to the business;
   generating a second line of communication from the telecommunications service provider to the consumer; and
   connecting the first line of communication and the second line of communication.

23. The method of claim 22, wherein the first line of communication comprises a telephone call from the telecommunications service provider to the business and the second line of communication comprises a telephone call from the telecommunications service provider to the consumer.

24. A system of connecting a business to a consumer, the system comprising:
   a search engine system in communication with the network, wherein the search engine system comprises a processor and a non-transitory computer readable medium having first software stored thereon, the first software programming the search engine system to:
   receive a search request from a consumer computing device,
   generate a search result document in response to the search request, wherein the search result document includes a request for consumer contact information,
   transmit the search result document to the consumer computing device,
   display an input pop-up window on the consumer computing device requesting the consumer to provide contact information of the consumer and to select a preferred mode of communication selected from a group consisting of telephone, e-mail, text messaging, and instant messaging (IM), and receive the consumer contact information and the preferred mode of communication from the consumer computing device via the input pop-up window; and an automated call generation system comprising a processor and a non-transitory computer readable medium having second software stored thereon, the automated call generation system in communication with the search engine system via the network, wherein the second software programs the automated call generation system to:

receive the consumer contact information and the preferred mode of communication from the search engine system, automatically generate a line of communication from a communications equipment associated with the preferred mode of communication and located at the business to the consumer, transmit a message to both the consumer and the business that the business is not available at a particular moment, based on a determination that the line of communication cannot be established from the business to the consumer; and charge a fee to the business for generating the line of communication.

25. The system of claim 24, further comprising displaying the search result document on the consumer computing device in the form of a search result pop-up window.

26. The system of claim 24, wherein the consumer computing device is configured to display the search result document as a web-page on a website of the business.

27. The system of claim 24, wherein the automated call generation system is further configured to receive the consumer contact information.

28. The system of claim 27, wherein the automated call generation system is further configured to establish the line of communication from the business to the consumer by:
   automatically transmitting the consumer contact information to a telecommunication service provider;
   generating a first line of communication from the telecommunications service provider to the business;
   generating a second line of communication from the telecommunications service provider to the consumer; and
   connecting the first line of communication and the second line of communication.

29. The system of claim 28, wherein the first line of communication comprises a telephone call from the telecommunications service provider to the business and the second line of communication comprises a telephone call from the telecommunications service provider to the consumer.

30. The system of claim 28, further comprising a billing system in communication with the automated call generation system and configured to charge the fee to the business for generating the line of communication between the business and the consumer.

* * * * *